United States Patent
Gwak et al.

(10) Patent No.: US 8,593,566 B2
(45) Date of Patent: Nov. 26, 2013

(54) METHOD AND APPARATUS FOR CONTROLLING LIGHT EMISSION OF FLASH AND DIGITAL PHOTOGRAPHING APPARATUS USING THE METHOD AND APPARATUS

(75) Inventors: Jin-pyo Gwak, Suwon-si (KR); Won-kyu Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 12/619,823

(22) Filed: Nov. 17, 2009

(65) Prior Publication Data
US 2010/0123821 A1 May 20, 2010

(30) Foreign Application Priority Data
Nov. 18, 2008 (KR) .................. 10-2008-0114849

(51) Int. Cl.
*H04N 5/222* (2006.01)
*H04N 9/07* (2006.01)

(52) U.S. Cl.
USPC .................................... 348/371; 348/266

(58) Field of Classification Search
None
See application file for complete search history.

(56) References Cited

U.S. PATENT DOCUMENTS

| | | | |
|---|---|---|---|
| 7,428,378 B1* | 9/2008 | Warpakowski Furlan | 396/157 |
| 7,675,569 B2* | 3/2010 | Maeda | 348/371 |
| 7,815,120 B2* | 10/2010 | Carlson | 235/462.41 |
| 2006/0202038 A1* | 9/2006 | Wang et al. | 235/462.24 |
| 2007/0236593 A1* | 10/2007 | Yu | 348/333.01 |
| 2007/0263106 A1* | 11/2007 | Tanaka et al. | 348/297 |
| 2009/0251584 A1* | 10/2009 | Alakarhu | 348/333.01 |

FOREIGN PATENT DOCUMENTS

| | | |
|---|---|---|
| JP | 2002-064752 A | 2/2002 |
| JP | 2006-101492 A | 4/2006 |
| JP | 2007-325026 A | 12/2007 |
| KR | 1020070116231 A | 12/2007 |

* cited by examiner

*Primary Examiner* — Justin P Misleh
(74) *Attorney, Agent, or Firm* — Drinker Biddle & Reath LLP

(57) ABSTRACT

Provided is a method and apparatus for controlling light emission of a flash. The method includes: during a pre-emission flash, exposing an image sensor by opening a global shutter; measuring light reflected from a subject by using the image sensor, and calculating a flash emission time of the flash based on the measured light; and controlling the flash to fire a main-emission flash for the calculated flash emission time. Accordingly, a partial exposure during a pre-emission flash, even in an image sensor that operates by using a rolling shutter, can be prevented.

11 Claims, 4 Drawing Sheets

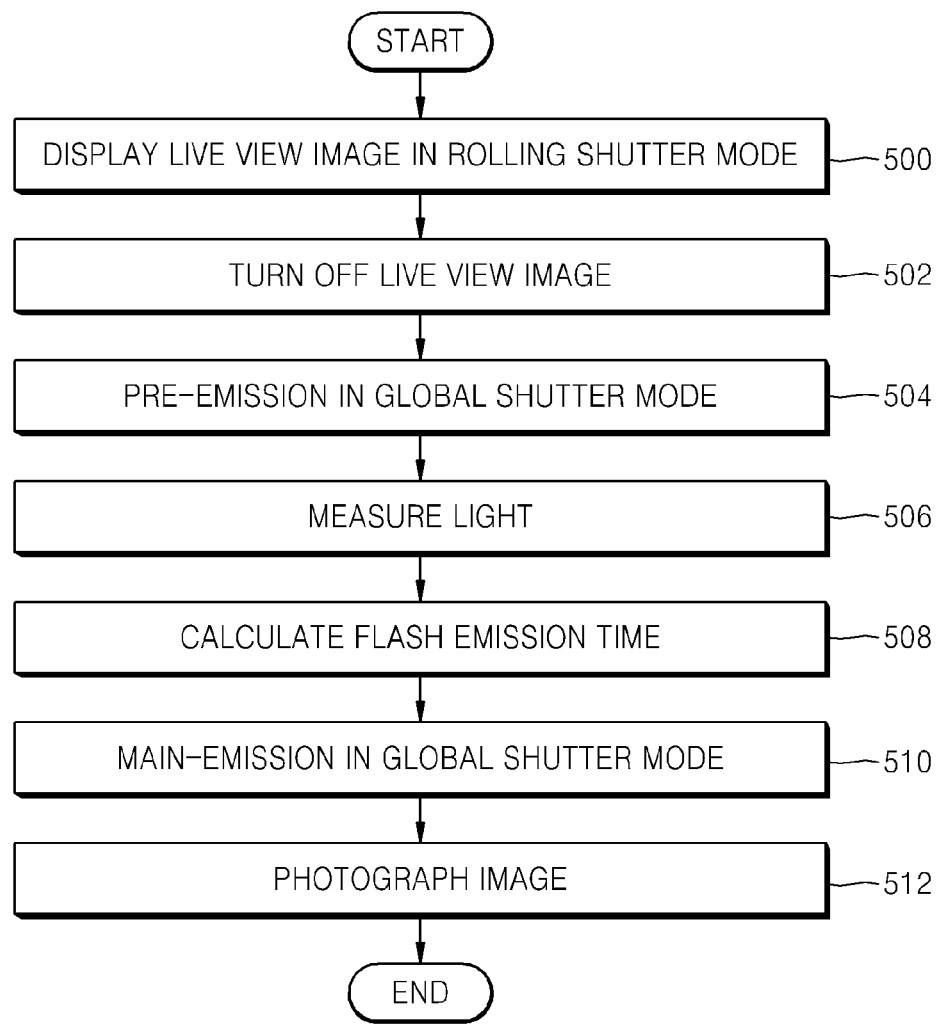

METHOD AND APPARATUS FOR CONTROLLING LIGHT EMISSION OF FLASH AND DIGITAL PHOTOGRAPHING APPARATUS USING THE METHOD AND APPARATUS

CROSS-REFERENCE TO RELATED PATENT APPLICATION

This application claims the benefit of Korean Patent Application No. 10-2008-0114849, filed on Nov. 18, 2008, in the Korean Intellectual Property Office, the disclosure of which is incorporated herein in its entirety by reference.

BACKGROUND

The present invention relates to a method and apparatus for controlling light emission of a flash, and more particularly, to a method and apparatus for controlling light emission of a flash in an image sensor, e.g., a complementary metal oxide semiconductor (CMOS) sensor, that uses a rolling shutter.

In general, digital cameras include a flash using a Xenon discharge tube. Flashes adjust flash intensity to illuminate a subject when there is not enough available light to adequately expose an image sensor. Such adjustment depends on a flash emission time. That is, the longer the flash emission time, the brighter the subject, and the shorter the flash emission time, the darker the subject. Since the brightness of the subject is controlled by the flash emission time, an algorithm for controlling the flash emission time is required and the following two algorithms are often used.

In an algorithm based on an optical sensor method using an optical sensor, a flash emits light and, at the same time, the brightness of a subject is measured. When the brightness of the subject reaches a preset brightness level due to the light emitted by the flash, the flash stops emitting the light. The subject is photographed for a flash emission time of the flash.

In an algorithm based on a pre-emission method, a flash emits light at a low brightness, the brightness of a subject is measured, a flash emission time of the flash taken to make the subject reach a preset brightness level is calculated, and the flash emits light for the calculated flash emission time to photograph the subject.

A complementary metal oxide semiconductor (CMOS) image sensor operates by using a rolling shutter in a live view mode. If the CMOS image sensor operates by using the rolling shutter and a subject or a photographer moves during shooting, an image distortion due to an exposure time difference, which is known as a rolling shutter effect, may occur.

There are the following problems in applying the aforesaid algorithms based on the two methods to the CMOS image sensor. The optical sensor method can be performed in the same manner as a conventional method, but since the optical sensor is used, the price of the optical sensor is added, it is difficult to correct a partial exposure of the subject, and a process of adjusting the optical sensor has to be added to a production process.

Although the pre-emission method is widely used, if the pre-emission method is applied to the CMOS image sensor that operates by using the rolling shutter, a partial exposure occurs. That is, if the brightness of an image is locally measured during a pre-emission, the brightness cannot be normally calculated. Such a partial exposure commonly occurs in image sensors that operate by using rolling shutters.

SUMMARY

Various embodiments of the present invention provide a method and apparatus for controlling light emission of a flash which can accurately measure brightness during a pre-emission even in an image sensor that operates by using a rolling shutter.

They also provide a digital photographing apparatus using the method and apparatus.

According to an aspect of the present invention, there is provided a method of controlling light emission of a flash, the method comprising: during a pre-emission, exposing an image sensor by opening a global shutter; measuring light reflected from a subject by using the image sensor, and calculating a flash emission time of the flash based on the measured light; and controlling the flash to fire a main-emission for the calculated flash emission time.

The image sensor may be a complementary metal oxide semiconductor (CMOS) image sensor.

The CMOS image sensor may operate by using a rolling shutter in a live view mode.

Before the exposing of the image sensor, the method may further comprise: displaying a live view image by opening the rolling shutter of the CMOS image sensor; and turning off the live view image before the pre-emission.

The method may further comprise controlling the flash to fire a main-emission during the calculated flash emission time and photographing the subject by opening the global shutter.

According to another aspect of the present invention, there is provided a method of controlling light emission of a flash by controlling an image sensor that can operate by using a rolling shutter and a global shutter, the method comprising: displaying a live view image by operating the image sensor by using the rolling shutter; during a pre-emission, measuring light reflected from a subject to be photographed by operating the image sensor by using the global shutter; and calculating a flash emission time of the flash based on the measured light, and controlling the flash to fire a main-emission for the calculated flash emission time.

The image sensor may be a CMOS image sensor.

Before the pre-emission, the method may further comprise turning off the live view image.

The method may further comprise controlling the flash to fire a main-emission during the calculated flash emission time and photographing the subject by operating the image sensor by using the global shutter.

According to another aspect of the present invention, there is provided an apparatus for controlling light emission of a flash, the apparatus comprising: an image sensor control unit, during a pre-emission, controlling an image sensor to be exposed by opening a global shutter; a main control unit controlling the image sensor to measure light reflected from a subject; a flash emission time calculating unit calculating a flash emission time of the flash based on the measured light; and a flash control unit controlling the flash to fire a main-emission for the calculated flash emission time.

The image sensor may be a CMOS sensor.

The CMOS image sensor may operate by using a rolling shutter in a live view mode.

Before the pre-emission, the live view mode may be controlled to be turned off.

According to another aspect of the present invention, there is provided a digital photographing apparatus comprising: an image sensor operable by using a rolling shutter and a global shutter; a flash firing a pre-emission and a main-emission in order to control an exposure of a subject; and an apparatus for controlling light emission of the flash, the apparatus being adapted to, during the pre-emission, measure light reflected from the subject by operating the image sensor by using the global shutter, calculate a flash emission time of the flash based on the measured light, and control the flash to fire the main-emission for the calculated flash emission time.

According to another aspect of the present invention, there is provided a computer program product, comprising a computer usable medium having a computer readable program code embodied therein, said computer readable program code adapted to be executed to implement a method for controlling light emission of a flash, said method comprising:

BRIEF DESCRIPTION OF THE DRAWINGS

The above and other features and advantages of the present invention will become more apparent by describing in detail exemplary embodiments thereof with reference to the attached drawings in which:

FIG. 5 is a flow chart illustrating a method of controlling light emission of a flash, according to another embodiment of the present invention.

DETAILED DESCRIPTION OF THE EMBODIMENTS

The present invention will now be described more fully with reference to the accompanying drawings, in which exemplary embodiments of the invention are shown. In the following description, a detailed description of techniques or structures related to the present invention which may unnecessarily make the point of the present invention obscure may be omitted.

The terms and words which are used in the present specification and the appended claims should not be construed as being confined to common meanings or dictionary meanings but be construed as meanings and concepts matching with the technical spirit of the present invention in order to describe the present in the base fashion.

Figure 1:
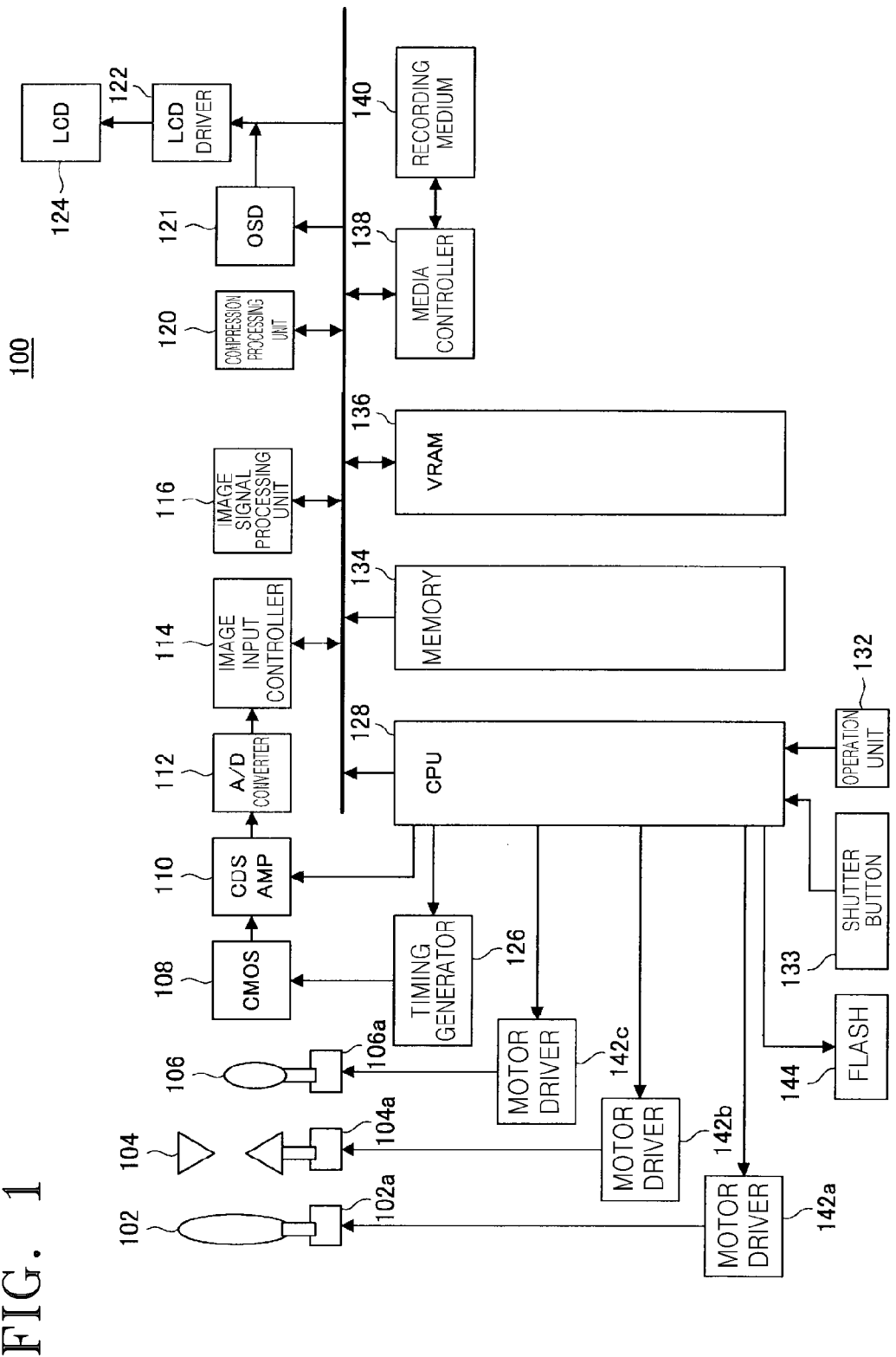
FIG. 1 is a block diagram of a digital photographing apparatus according to an embodiment of the present invention.

A digital photographing apparatus and method according to the present invention will now be explained. FIG. 1 is a block diagram of a digital photographing apparatus 100 according to an embodiment of the present invention. The configuration of the digital photographing apparatus 100 will now be explained with reference to FIG. 1.

Referring to FIG. 1, the digital photographing apparatus 100 includes a zoom lens 102, an aperture 104, a focus lens 106, driving devices 102a, 104a, and 106a, a complementary metal oxide semiconductor (CMOS) image sensor 108, an amplifier-integrated correlated double sampling (CDS) circuit unit 110, an analog/digital (A/D) converter 112, an image input controller 114, an image signal processing unit 116, a compression processing unit 120, an on-screen display (OSD) 121, a liquid crystal display (LCD) driver 122, an LCD 124, a timing generator 126, a central processing unit (CPU) 128, an operation unit 132, a shutter button 133, a memory 134, a video random access memory (VRAM) 136, a media controller 138, a recording medium 140, motor drivers 142a, 142b, and 142c, and a flash 144. The zoom lens 102 is moved by the driving device 102a back and forth along an optical axis to continuously change a focal length and thus to change the size of a subject. The aperture 104 is driven by the driving device 104a to adjust the amount of light entering the CMOS image sensor 108 when an image is photographed. The focus lens 106 is moved by the driving device 106a back and forth along the optical axis to focus on the subject.

While only one zoom lens 102 and one focus lens 106 are used in FIG. 1, two or more zoom lenses 102 and two or more focus lenses 106 may be used.

The CMOS image sensor 108 converts light incident from the zoom lens 102, the aperture 104, and the focus lens 106 into an electric signal. While the CMOS image sensor 108 uses an electronic shutter to adjust a time for which the electric signal is extracted by controlling the incident light in FIG. 1, a mechanical shutter may be used instead of the electronic shutter. While the zoom lens 102, the aperture 104, the focus lens 106, and the CMOS image sensor 108 constitute an image pickup device in FIG. 1, the present invention is not limited thereto and the zoom lens 102 or the aperture 104 may be omitted from the elements constituting the image pickup device.

The CDS circuit unit 110 is formed by integrating a CDS circuit, which is a sampling circuit for removing noise from the electric signal output from the CMOS image sensor 108, with an amplifier for amplifying the electric signal from which the noise is removed. While the CDS circuit unit 110 includes the CDS circuit and the amplifier which are integrated with each other in FIG. 1, the present invention is not limited thereto and the CDS circuit and the amplifier may be configured as separate circuits.

The A/D converter 112 converts the electric signal generated by the CMOS image sensor 108 into a digital signal, and generates image RAW data.

The image input controller 114 controls the image RAW data generated by the A/D converter 112 to be stored in the memory 134.

The image signal processing unit 116 adjusts a light intensity gain or a white balance for the electric signal output from the CMOS image sensor 108. The image signal processing unit 116 obtains exposure data of the photographed image. The exposure data includes an autofocus (AF) evaluation value or an auto exposure (AE) evaluation value, and the image signal processing unit 116 calculates the AF evaluation value or the AE evaluation value.

The compression processing unit 120 compresses the image processed by the image signal processing unit 116 to image data in an appropriate format. The compression may be either lossless compression or lossy compression. Examples of the appropriate format may include Joint Photographic Experts Group (JPEG) and JPEG 2000.

The OSD 121 allows default information of the digital photographing apparatus 100 to be displayed on the LCD 124. The LCD 124 displays a live view image before shooting, various default information of the digital image processing apparatus 100, or the photographed image. The LCD 124 is driven by the LCD driver 122 to display the image or the various information of the digital image processing apparatus 100.

The timing generator 126 generates a timing signal and inputs the generated timing signal to the CMOS image sensor 108. A shutter speed is determined by the timing signal generated by the timing generator 126. That is, the CMOS image sensor 108 is driven by the timing signal generated by the timing generator 126, and image light reflected from the subject is incident within a period of time for which the CMOS image sensor 108 is driven to generate the electric signal based on which the image data is produced.

The CPU 128 executes a command of a signal system on the CMOS image sensor 108 or the CDS circuit unit 110, or executes a command of an operation system with respect to the operation of the operation unit 132. While only one CPU 128 is used in FIG. 1, the present invention is not limited thereto and the command of the signal system and the command of the operation system may be separately executed by separate CPUs 128.

The operation unit 132 includes a member for operating the digital photographing apparatus 100 or making various settings for photographing. On the member included in the operation unit 132, a power button, an OK button, and a cross key for selecting a photographing mode or a photographing drive mode and setting a soft focus effect are disposed. When the shutter button 133 is pressed halfway, the subject is focused, and when the shutter button 133 is pressed all the way, the subject is photographed.

The memory 134, which is an image storage unit, temporarily stores the photographed image or a composite image produced by an image composition unit 118. The memory 134 has a capacity large enough to store a plurality of images.

The memory 134 is controlled by the image input controller 114 to read and write the images.

The VRAM 136 stores the image data and the various default information displayed on the LCD 124. The resolution or the maximum number of colors of the LCD 124 depends on the capacity of the VRAM 136.

The recording medium 140, which is an image recording unit, records the photographed image. The recording medium 140 is controlled by the media controller 138 to input and output the recorded image. The recording medium 140 may be a memory card that is a solid-state flash memory data storage device.

The motor drivers 142a, 142b, and 142c control the driving devices 102a, 104a, and 105a which respectively drive the zoom lens 102, the aperture 104, and the focus lens 106. The zoom lens 102, the aperture 104, and the focus lens 106 are driven by the motor drivers 142a, 142b, and 142c to adjust the size of the subject, light intensity, and focus, respectively.

The flash 144 illuminates the subject when there is not enough available light to photograph the subject, for example, outdoors at night or dark indoors. During flash photographing, the CPU 128 transmits a flash command to the flash 144, and the flash 144 emits light according to the flash command received from the CPU 128 to illuminate the subject.

The digital photographing apparatus 100 according to an embodiment of the present invention has been explained with reference to FIG. 1. The configuration of the CPU 128 will be explained.

Figure 2:
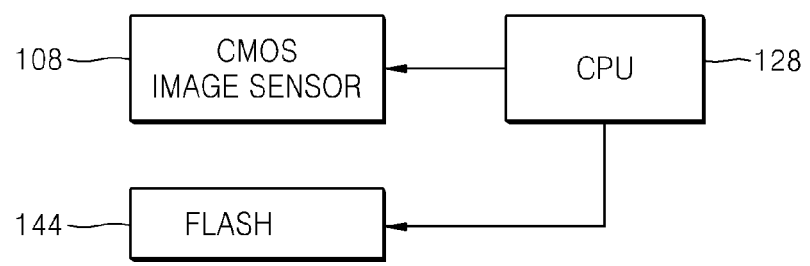
FIG. 2 is a block diagram of a digital photographing apparatus including an apparatus for controlling light emission of a flash, according to another embodiment of the present invention.

FIG. 2 is a block diagram of a digital photographing apparatus 200 for controlling light emission of the flash 144, according to another embodiment of the present invention.

The digital photographing apparatus 200 includes the CMOS image sensor 108, the CPU 128, and the flash 144.

The CMOS image sensor 108 may operate by using a rolling shutter or a global shutter. The rolling shutter operates in such a manner that pixels are sequentially exposed over the course of a single frame. Accordingly, there is an exposure time difference between the pixels. On the other hand, the global shutter operates in such a manner that all pixels are exposed at one time and thus the whole of the frame is captured simultaneously. Accordingly, there is no exposure time difference between the pixels.

The CMOS image sensor 108 operates in an exposure mode such as a rolling shutter mode or a global shutter mode.

The rolling shutter mode permits a fast image output, is generally used in a live view mode, and can also be used in an image photographing mode. The rolling shutter mode can be used without a mechanical shutter, and an exposure time is controlled only by an electronic shutter. On the other hand, the global shutter mode does not permit a fast image output, is generally used in an image photographing mode, and cannot be used without a mechanical shutter. An exposure time is controlled by the combination of the mechanical shutter and an electronic shutter.

The flash 144 fires a pre-emission and a main-emission in order to control the exposure of the subject to be photographed. The pre-emission is a low-power flash used before the main-emission to measure the brightness of the subject, and the main-emission is a flash used after the pre-emission to calculate a flash emission time taken to make the brightness of the subject reach a preset brightness level and emits light for the calculated flash emission time.

The CPU 128 using a pre-emission method controls the flash 144 to fire a pre-emission flash, and controls the CMOS image sensor 108 to measure light from the subject by using the global shutter. Also, the CPU 128 calculates a flash emission time of the flash 144 based on the measured light, and controls the flash 144 to fire a main-emission for the calculated flash emission time. Accordingly, an error in the calculation of the flash emission time due to a partial exposure (which is a problem caused when the CMOS image sensor 108 operates by using the rolling shutter, for example, a pre-emission flash is fired while a live view image is displayed) can be solved.

The configuration of the CPU 128, which is an apparatus for controlling light emission of the flash 144, will now be explained with reference to FIG. 3.

Figure 3:
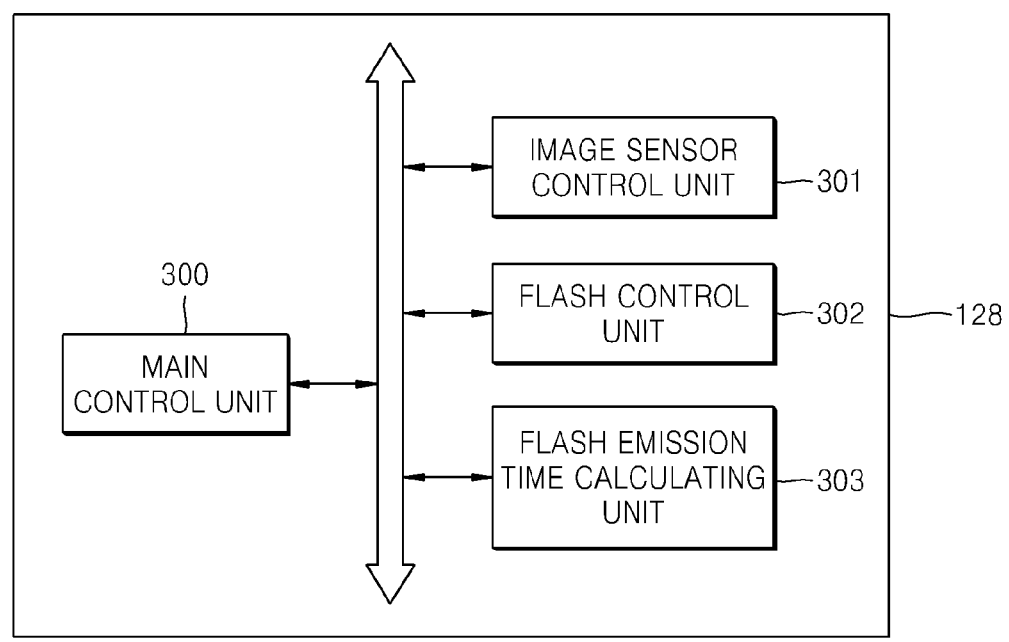
FIG. 3 is a block diagram of the apparatus for controlling the light emission of the flash of the digital photographing apparatus of FIG. 2, according to an embodiment of the present invention.

FIG. 3 is a block diagram of the CPU 128 of the digital photographing apparatus 200 of FIG. 2, according to an embodiment of the present invention. The configuration of the CPU 128 of the digital photographing apparatus 200 of FIG. 2 will now be explained with reference to FIG. 3. Here, the CPU 128 and an apparatus for controlling light emission of a flash recited in the appended claims should be construed as the same element.

The CPU 128 controls the overall operation of the digital photographing apparatus 200. Also, the CPU 128 controls the flash 144 to emit light.

The CPU 128 includes a main control unit 300, an image sensor control unit 301, a flash control unit 302, and a flash emission time calculating unit 303.

The main control unit 300 controls the overall operation of the elements of the CPU 128 and the digital photographing apparatus 100. If a flash photographing mode is selected by a user according to a pre-emission method, the main control unit 300 controls the flash control unit 302 to fire a pre-emission flash. In this case, the image sensor control unit 301 controls the image sensor 108 to be exposed by opening the global shutter.

When the image sensor 108 is exposed, the main control unit 300 controls the image sensor 105 to measure light reflected from the subject. The flash emission time calculating unit 303 calculates a flash emission time of the flash 144 based on the measured light. In general, a flash emission time is calculated by calculating a desired subject brightness based on a measured current ambient illuminance and a measured subject brightness, and estimating the amount of light to be added to the current ambient illuminance. Various other methods may be used to calculate a flash emission time according to the pre-emission method.

The flash control unit 302 controls the flash 144 to emit light for the flash emission time calculated by the flash emission time calculating unit 303.

Figure 4:
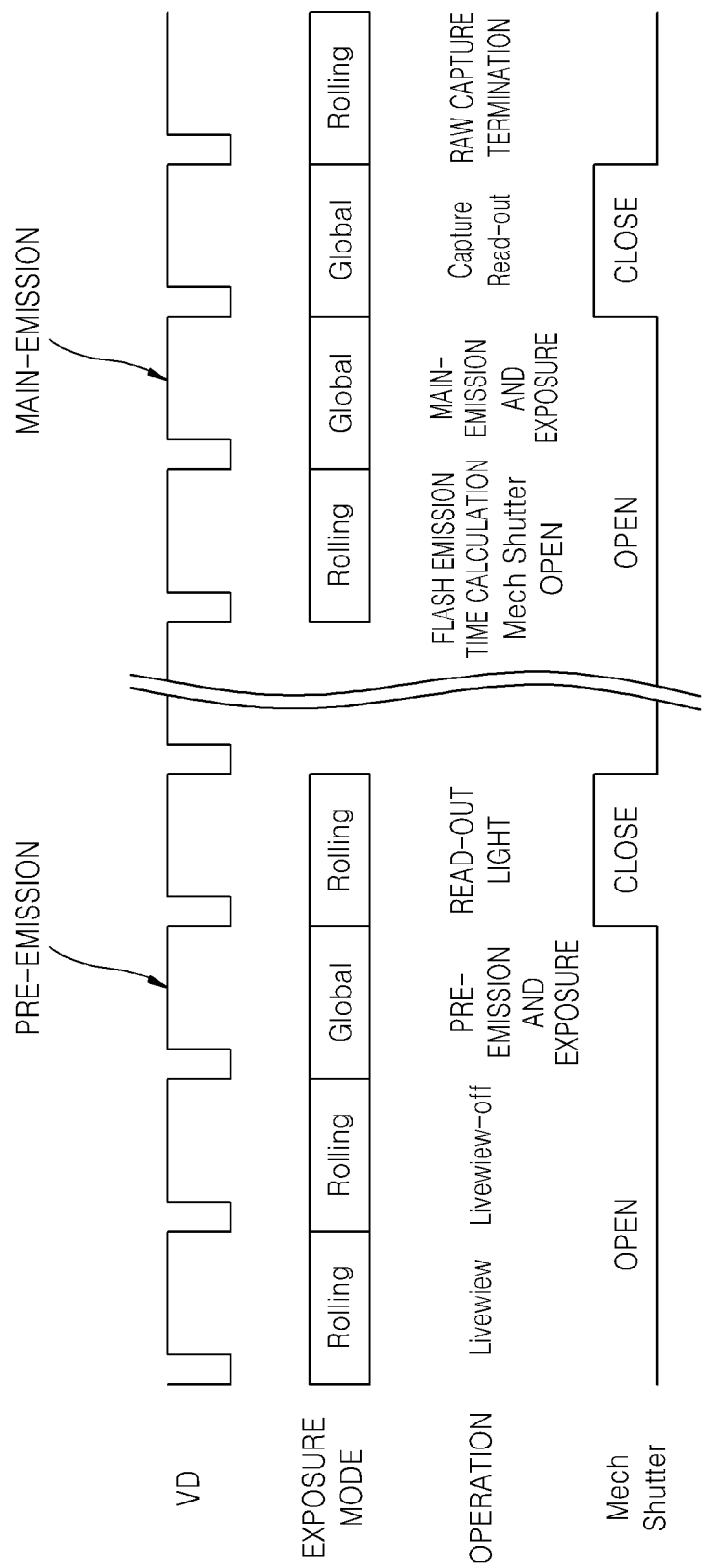
FIG. 4 is a timing diagram for explaining the function of an apparatus for controlling light emission of a flash according to another embodiment of the present invention.

FIG. 4 is a timing diagram for explaining the function of an apparatus for controlling light emission of a flash according to another embodiment of the present invention.

Referring to FIG. 4, while a live view image is displayed, an exposure is performed in a rolling shutter mode with a mechanical shutter being opened. If a pre-emission flash is to be fired, an exposure is performed by using a global shutter.

If a CMOS image sensor operates in a rolling shutter mode, an exposure time is controlled by controlling a register. That is, a register setting time increases, an exposure increases, and as a register setting time decreases, an exposure decreases. On the other hand, if the CMOS image sensor operates in a global shutter mode, an exposure continues within a time range from a register setting time to a time when the mechanical shutter is closed.

If the CMOS image sensor of FIG. 4 changes from the rolling shutter mode to the global shutter mode, invalid data of 1-2 frames is output. Due to the invalid data, a stop error screen is shown. Accordingly, the apparatus of FIG. 4 may prevent such a stop error screen due to the global shutter from being shown by turning off the live view image before the pre-emission. Also, the apparatus of FIG. 4 may prevent a partial exposure caused by a rolling shutter effect by performing an exposure in the global shutter mode, not in the rolling shutter mode, during the pre-emission.

A conventional flash emission time control algorithm may be used to calculate a flash emission time. The flash fires a main-emission flash for the calculated flash emission time to photograph an image.

FIG. 5 is a flowchart illustrating a method of controlling light emission of a flash, according to an embodiment of the present invention.

Referring to FIG. 5, in operation 500, a live view image is displayed by performing an exposure in a rolling shutter mode. In operation 503, the live view image is turned off in order to prevent invalid data, which is output because an exposure time is increased when the rolling shutter mode changes to a global shutter mode, from being recognized by a user. In operation 504, an exposure is performed in the global shutter mode to fire a pre-emission flash. In operation 506, light is measured. In operation 506, a flash emission time is calculated based on the measured light. In operations 510 and 512, a main-emission flash is fired in the global shutter mode and an image is photographed.

While a digital camera has been described as the digital photographing apparatus to which the invention can be applied in the aforesaid embodiments, the present invention is not limited thereto. As the digital photographing apparatus, a camera phone provided with a camera function, a personal digital assistant (PDA), and a portable multimedia player (PMP) may be used.

As described above, the method and apparatus for controlling light emission of a flash according to the present invention can solve a partial exposure during a pre-emission flash in an image sensor that operates by using a rolling shutter by exposing the image sensor by opening a global shutter to measure light, calculating a flash emission time of the flash based on the measured light, and controlling the flash to fire a main-emission flash for the calculated flash emission time.

Furthermore, the method and apparatus according to the present invention can accurately measure the brightness of a subject during a pre-emission even in the image sensor that operates by using the rolling shutter.

The present invention may be embodied as computer-readable codes in a computer-readable recording medium. The computer-readable recording medium may be any recording apparatus capable of storing data that is read by a computer system.

Examples of the computer-readable recording medium include read-only memories (ROMs), random-access memories (RAMs), CD-ROMs, magnetic tapes, floppy disks, and optical data storage devices. The computer-readable recording medium may be a carrier wave that transmits data via the Internet, for example. The computer readable medium may be distributed among computer systems that are interconnected through a network, and the present invention may be stored and implemented as computer readable codes in the distributed system. Functional programs, codes, and code segments for embodying the present invention may be easily derived by programmers in the technical field to which the present invention pertains.

While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A method of controlling light emission of a flash, the method comprising:
    during a pre-emission flash, exposing an image sensor surface and operating an image sensor having pixels such that all pixels in the image sensor start processing image data simultaneously at a first time and stop processing image data simultaneously at a second time;
    determining light reflected from a subject based on image data processed by the image sensor;
    calculating a main-flash emission time of the flash based on the determined light;
    controlling the flash to fire a main-emission flash for the calculated main-flash emission time; and
    photographing the subject by performing the following operations while the main-emission flash is fired:
        exposing the image sensor for at least the calculated flash main-flash emission time; and
        operating the image sensor such that all pixels in the image sensor start processing image data simultaneously at a third time and stop processing image data simultaneously at a fourth time;
    wherein a rolling shutter operation mode of the image sensor is active during a time following the pre-emission flash and preceding the main-emission flash.

2. The method of claim 1, wherein the image sensor is a complementary metal oxide semiconductor (CMOS) image sensor.

3. The method of claim 2, wherein the CMOS image sensor operates in a rolling shutter mode in a live view mode, except during the pre-emission flash and the main-emission flash.

4. A method of controlling light emission of a flash and controlling an image sensor, the method comprising:
    displaying a live view image by operating the image sensor in a rolling shutter mode;
    during a pre-emission flash, measuring light reflected from a subject to be photographed by exposing an image sensor surface and operating an image sensor having pixels such that all pixels in the image sensor start processing image data simultaneously at a first time and stop processing image data simultaneously at a second time;
    calculating a main-flash emission time of the flash based on the measured light;
    controlling the flash to fire a main-emission flash for the calculated main-flash emission time; and
    photographing the subject by performing the following operations while the main-emission flash is fired:
        exposing the image sensor for at least the calculated main-flash emission time; and
        operating the image sensor such that all pixels in the image sensor start processing image data simultaneously at a third time and stop processing image data simultaneously at a fourth time;
    wherein a rolling shutter operation mode of the image sensor is active during a time following the pre-emission flash and preceding the main-emission flash.

5. The method of claim 4, wherein the image sensor is a CMOS image sensor.

6. The method of claim 4, further comprising, before the pre-emission flash, turning off the live view image.

7. A computer program product, comprising a non-transitory computer readable storage medium having a computer readable program code embodied therein, that implements the method of claim 1, when executed by a processor.

8. An apparatus for controlling light emission of a flash, the apparatus comprising:
    an image sensor control unit that controls, during a pre-emission flash, an image sensor having pixels to operate such that all pixels in the image sensor start processing image data simultaneously at a first time and stop processing image data simultaneously at a second time;
    a main control unit that controls the image sensor to determine light reflected from a subject based on image data processed by the image sensor;
    a flash emission time calculating unit that calculates a main-flash emission time of the flash based on the determined light; and
    a flash control unit that controls the flash to fire a main-emission flash for the calculated main-flash emission time,
    wherein the image sensor control unit photographs the subject by performing the following operations while the main-emission flash is fired:
        exposing the image sensor for at least the calculated main-flash emission time and
        operating the image sensor such that all pixels in the image sensor start processing image data simultaneously at a third time and stop processing image data simultaneously at a fourth time;
    wherein a rolling shutter operation mode of the image sensor is active during a time following the pre-emission flash and preceding the main-emission flash.

9. The apparatus of claim 8, wherein the image sensor is a CMOS sensor.

10. The apparatus of claim 9, wherein the CMOS image sensor operates in a rolling shutter mode in a live view mode, except during the pre-emission flash and the main-emission flash.

11. A digital photographing apparatus comprising:
    an image sensor;
    a flash that fires a pre-emission flash and a main-emission flash to control an exposure of a subject; and
    an apparatus for controlling light emission of the flash by:
        during the pre-emission, measuring light reflected from the subject by exposing an image sensor surface and operating an image sensor having pixels such that all pixels in the image sensor start processing image data simultaneously at a first time and stop processing image data simultaneously at a second time;
        calculating a main-flash emission time of the flash based on the measured light;

controlling the flash to fire the main-emission flash for the calculated flash emission time; and photographing the subject by performing the following operations while the main-emission flash is fired:
- exposing the image sensor for at least the calculated main-flash emission time and
- operating the image sensor such that all pixels in the image sensor start processing image data simultaneously at a third time and stop processing image data simultaneously at a fourth time;

wherein a rolling shutter operation mode of the image sensor is active during a time following the pre-emission flash and preceding the main-emission flash.

* * * * *

UNITED STATES PATENT AND TRADEMARK OFFICE
CERTIFICATE OF CORRECTION

PATENT NO. : 8,593,566 B2  
APPLICATION NO. : 12/619823  
DATED : November 26, 2013  
INVENTOR(S) : Jin-pyo Gwak and Won-kyu Jang Page 1 of 1

It is certified that error appears in the above-identified patent and that said Letters Patent is hereby corrected as shown below:

IN THE CLAIMS:

In Claim 1, Column 9, lines 38-39, replace "the calculated flash main-flash emission time" with -- the calculated main-flash emission time --

Signed and Sealed this  
Seventh Day of October, 2014

Michelle K. Lee  
*Deputy Director of the United States Patent and Trademark Office*